Dec. 19, 1922. 1,439,671.
B. W. KADEL.
METHOD OF MANUFACTURING YOKES FOR RAILWAY DRAFT RIGGING.
FILED JUNE 28, 1920. 2 SHEETS—SHEET 1.

Inventor
Byers W. Kadel

WITNESS:—
Chas. L. Griesbauer By Ernest ... Machlin
his Attorney

Dec. 19, 1922.   1,439,671.
B. W. KADEL.
METHOD OF MANUFACTURING YOKES FOR RAILWAY DRAFT RIGGING.
FILED JUNE 28, 1920.   2 SHEETS—SHEET 2.
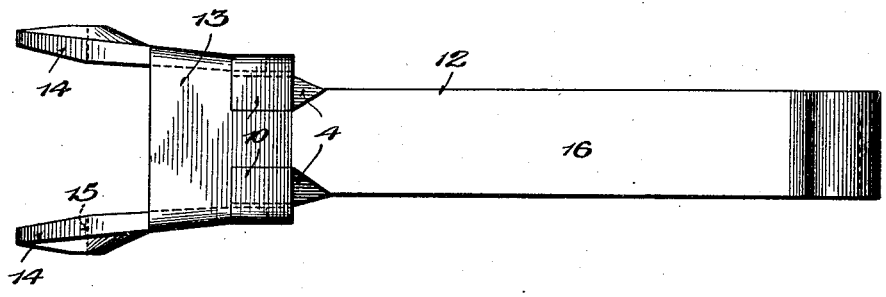
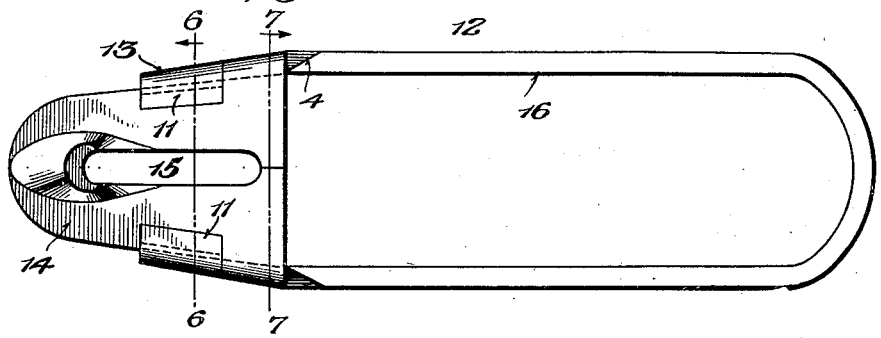
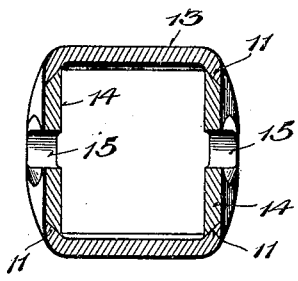 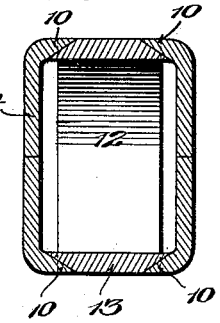 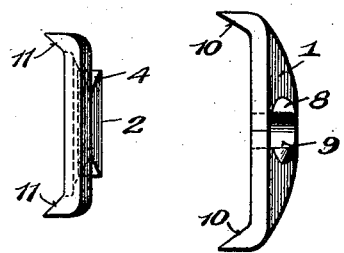

Patented Dec. 19, 1922.

1,439,671

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

METHOD OF MANUFACTURING YOKES FOR RAILWAY DRAFT RIGGING.

Application filed June 28, 1920. Serial No. 392,395.

*To all whom it may concern:*

Be it known that I, BYERS W. KADEL, a citizen of the United States, residing at Baltimore, State of Maryland, have invented certain new and useful Improvements in Methods of Manufacturing Yokes for Railway Draft Rigging; and I do hereby declare the following to be a full, clear, and exact description of the invention, such as will enable others skilled in the art to which it appertains to make and use the same.

The invention relates to a method of manufacturing yokes for railway draft rigging, and more particularly to a method of manufacturing yokes of the so called vertical type from forged or wrought metal; and the principal object of the invention, broadly stated, is to provide a method of constructing vertical yokes by a combined forging and welding process.

Another object of the invention is to provide a method of manufacturing vertical yokes of the conventional type, the finished article of the said process having maximum strength per unit of weight.

Another object of the invention is to provide a method for the manufacture of vertical yokes in which there is no waste due to loss of material, thereby affording an exceedingly economical method.

The method or process will be hereinafter more fully described in connection with the accompanying drawings, although it is to be understood that the steps of the process as hereinafter set forth do not necessarily occur in the sequence in which they are described and may be expeditiously employed in other sequence than the one set forth.

Referring now to the drawings:

Fig. 4 is a top plan view of the completed yoke.

Fig. 5 is a side elevation of the same, the parts being welded in assembled position.

Fig. 6 is a section on line 6—6 of Fig. 5, the direction in which the view is taken being indicated by the arrow.

Fig. 7 is a section taken on line 7—7 of Fig. 5, the direction of view being indicated by the arrow adjacent the end of the section line.

Fig. 8 is an end view of one of the yoke arms, and Fig. 9 is a corresponding end view of one of the side members of the yoke.

Throughout the specification and drawings like parts are designated by like reference characters.

Figure 1:
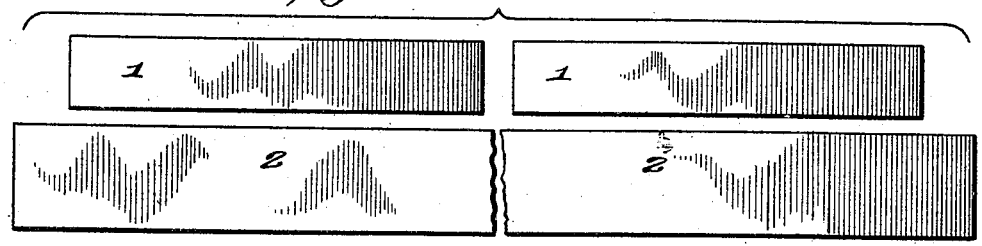
Figure 1 illustrates in plan view the pieces of bar stock from which the yoke is produced.
Figure 2:
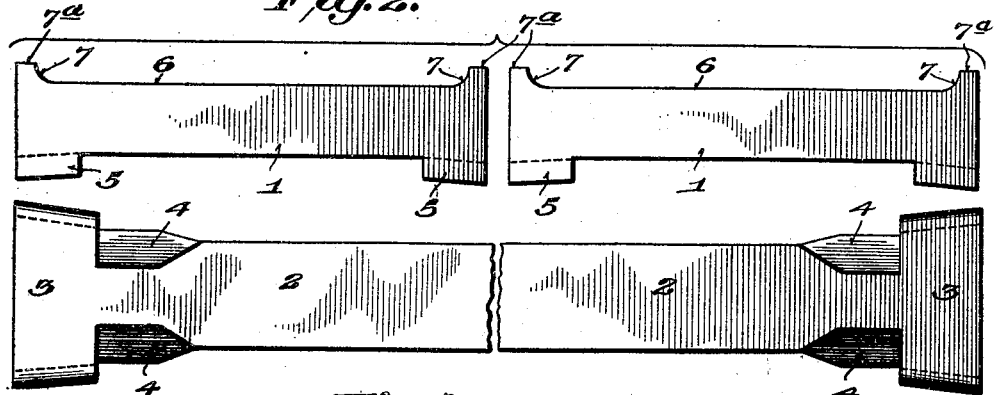
Fig. 2 is a plan view showing the same bar stock as illustrated in Fig. 1 after the same has been subjected to the forging or shaping steps of the process.

In carrying out my process I may cut from suitable bar stock three bars, 1, 1 and 2, as illustrated in Fig. 1. It will be understood that this bar stock may be of mild steel or wrought iron, and that the dimensions thereof may be varied in accordance with the size and dimensions desired of the finished article. The bar 2 which forms the loop portion of the finished article or yoke is preferably of slightly greater width and of considerably greater length than the portions of the bar stock 1, 1.

Figure 3:
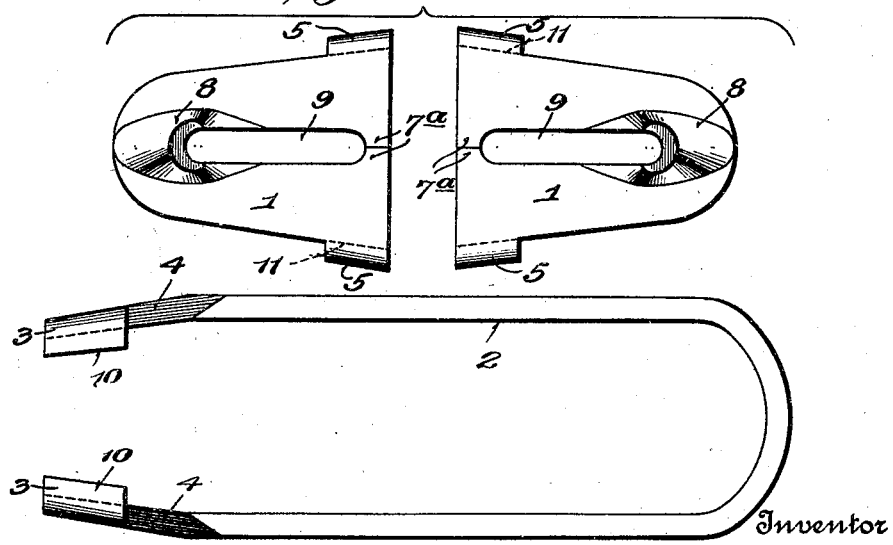
Fig. 3 illustrates the three members from which the yoke is produced, said members being shown as shaped to finished form, prior to bending and assembling to form the complete yoke.

Having the bars 1 and 2 of suitable length, the next step which may be performed in carrying out my method is to forge, shape or head the same so as to form T-heads 3, 3 at opposite ends of the bar. And preferably at this time and by the same process, I provide the bar 2 with the beveled faces 4, 4 to the rear of each T-head 3. The next step, without reference to time sequence, is to forge or shape the bars 1, 1 by a suitable device so as to provide the same on one side with outwardly projecting lugs 5, 5 adjacent the opposite ends thereof, and to form on the opposite side a depressed seat 6 terminating adjacent the ends of each bar in curved faces 7, 7. The bars 1, 1 may then be bent upon themselves until the faces 7ª adjacent the curved faces 7 abut. These bars are then subjected to a further forging or shaping process by which the excess metal at the central portion of each bar 1 is forced around the outer end of the slot 9 and preferably into the beveled form as shown at 8. It is to be observed that as a result of the bending of the bars 1 as hereinbefore described, the laterally projecting lugs 5, 5 of each bar now project from opposite sides of the said bars and form therewith T-headed members. These lugs 5, 5 are subsequently bent inwardly, substantially at right angles to the plane of the body portion of the bars 1 so that at the completion of the preliminary forging steps the bars 1 are in the form shown in Fig. 3. The bar 2 may coincidently be shaped into the form shown in Fig. 3. It should be observed that inner or adjacent faces of the lugs 5, 5 and the inwardly projecting portions of the T-heads are provided with inclined or beveled faces 11 and 10, respectively.

The three members of the yoke are then assembled in operative position, the beveled faces 11 of the lugs 5 being adapted to contact the correspondingly beveled faces 4 of the bar 2; and when the parts are assembled in this position they are welded together to form a single unitary structure. The faces 7ª are also preferably welded together.

The yoke 12 formed by my method comprises a hooded head 13 provided with side walls 14 each of which is formed with a coupler key receiving slot 15 the forward ends of which are thickened or reinforced to provide additional bearing surface for the said key. The loop member 16 forms the upper and lower walls of the hooded head 13 and extends rearwardly thereof so as to surround the cushioning element of the draft rigging in the customary manner.

While the yoke 12 is in fact made of three pieces it will be obvious to those skilled in the art that by following the method outlined and by welding the parts together an exceedingly strong and simple yoke is produced. In fact, the T-head formation hereinbefore described on both the side members and the loop member of the yoke are when assembled so interlocked that the metal of the yoke is placed in direct shear under pulling strains and all chance of the member separating is avoided.

Having now described my process, although it is to be understood that the terms used are employed in their descriptive and not in their limiting sense, and that changes of various kinds may be made in the device within the scope of the invention, I claim:—

1. The method of manufacturing draft yokes which consists in forming a plurality of bars with T-heads, arranging two of said bars on opposite sides of the third bar so that the T-heads thereof interlock, and finally welding said bars together adjacent said interlocking heads.

2. The method of manufacturing draft yokes which involves forging or shaping a plurality of bars to form lateral projections thereon, bending said bars, arranging said bars to form an annulus with the projections on one of said bars engaging the projections on the other of said bars, and welding said bars in assembled position.

3. The method of manufacturing draft yokes which consists in subjecting a plurality of steel bars to a forging or shaping process and forming projecting portions thereon bending said bars and interlocking said projecting portions, to form the hooded end of a yoke, and finally welding said bars in assembled position.

4. The method of manufacturing draft yokes which consists in forging a member to form T-heads thereon, bending said member into loop form, forging and bending a plurality of members to form side members engaging and interlocking said T-heads, and welding said side members to said loop.

5. The method of manufacturing draft yokes which involves forging a member to form T-heads thereon, bending said member to open loop form, forging and bending a plurality of members to form side members with lateral projections thereon, interlocking the projections on the side members with the projections on the loop member, and welding said side members to said loop member.

6. The method of manufacturing draft yokes which consists in shaping a member to form T-heads thereon, bending said member to form an open loop, shaping a plurality of members to form projections thereon, bending said last named members to bring said projections opposite each other to form T-heads on each of said members and interlocking and welding said last named members to the opposite sides of said first named member.

7. The method of manufacturing draft yokes which consists in forging a plurality of members to form lateral projections thereon, bending and shaping said projections to interlock and form an annulus, and subsequently welding the interlocking projections to produce the hood member of the yoke.

In testimony whereof I affix my signature.

B. W. KADEL.